Dec. 25, 1956 H. B. GORDON ET AL 2,775,751
MOBILE ELECTRICAL ALARM
Filed July 7, 1955
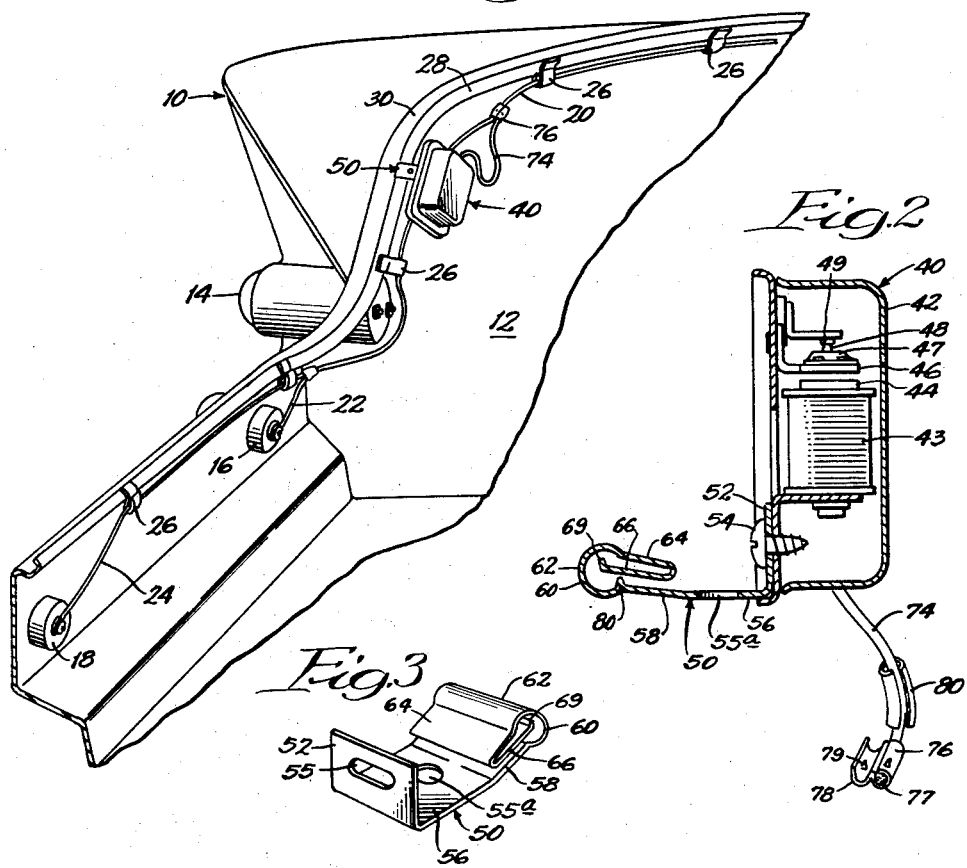
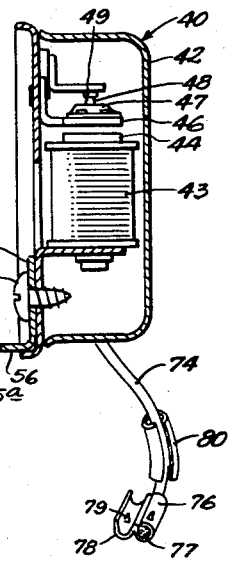
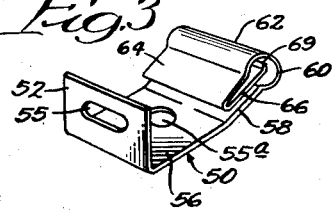
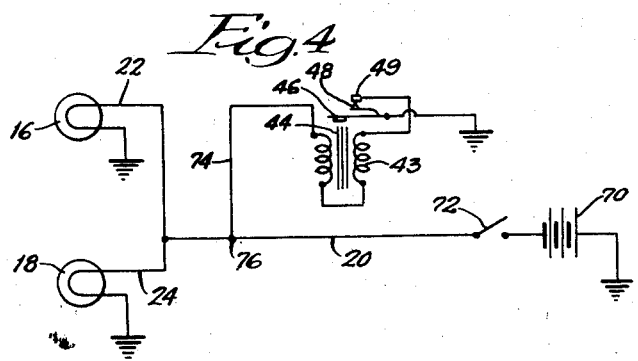
INVENTORS:
Harry B. Gordon
Aaron Gordon
Edward C. Abdelnour

United States Patent Office 2,775,751
Patented Dec. 25, 1956

2,775,751

MOBILE ELECTRICAL ALARM

Harry B. Gordon, Highland Park, and Aaron Gordon, Chicago, Ill., and Edward C. Abdelnour, New York, N. Y.

Application July 7, 1955, Serial No. 520,529

2 Claims. (Cl. 340—70)

This invention relates generally to an automatic signaling device, and more particularly to an electrical alarm for automotive and related mobile vehicles.

A large number of serious accidents to both life and property occur each year as a direct consequence of the operation of automobiles, trucks and farm vehicles in a reverse or suddenly changing direction. The American Safety Council has recognized that reverse runing or unexpected turning of automobiles, trucks, and other mobile vehicles constitute a substantial hazard to pedestrians. In order to reduce the number of accidents which are caused by reverse and turning movement of vehicles, the provision of back-up and turn signal lights by the automotive industry have proved to be valuable items of safety equipment. Such devices, however, provide a visual signal only, and are not readily detectable in daylight operation.

It is a primary object of the present invention, therefore, to provide an audible alarm device automatically actuated by the reverse or turning operation of an automotive or related mobile vehicle.

It is another object of this invention to provide a simple and low-cost electrical audible signal adapted for efficient use with all automotive electrical power systems.

It is a further object to provide an audible signal device having universal mounting means which permit the device to be readily secured in a detachable manner within the body of any automotive or related mobile vehicle.

It is still another object of this invention to provide an audible signal device having an electrical connector lead adapting the device for simple electrical conection in parallel with the electrical power system of the vehicle without interruption of the main circuit.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a fragmentary perspective view of the rear end of an automobile as seen from the interior of an open trunk compartment looking rearwardly and outwardly, and showing an audible signal device operatively mounted in a typical manner according to the present invention;

Figure 2 is a sectional view showing the audible signal device of the present invention mounted on an interior edge shoulder of an automotive vehicle body;

Figure 3 is a perspective view of the universal mounting bracket for attaching the audible signal device to the interior edge shoulder of an automotive vehicle body; and Figure 4 is a circuit diagram showing the operative connection of the audible signal device of this invention in parallel with a typical portion of the main electrical power circuit of an automobile such as that which serves to energize rear-end signal or tail lights during reverse, turning, or braking operation of the automobile.

Referring now more particularly to Figure 1 of the drawing, we have indicated generally at 10 the rear end of a conventional passenger automobile. The interior of an open rear trunk compartment of the automobile is designated at 12. The automobile is of the type having a tail light 14 and a pair of back-up lights 16 and 18. An eelctrical insulated lead line 20 provides circuit connection with the main electrical power system and battery of the vehicle, and provides a pair of branch leads 16 and 18. The main power circuit is of the well-known type which serves to provide a current supply to the back-up lights 16 and 18 when the vehicle is in reverse gear. It will be understood, of course, that the tail light 14 is also appropriately energized by the main power system under application of the brakes or manual actuation of a steering-post mounted turn signal or blinker device in conventional manner. The main lead 20 is suitably carried by a plurality of support clips 26 fixedly secured to an edge shoulder 28 of the automobile body which serves to define the trunk opening 12.

The body edge shoulder 28 is provided with a resilient sealing strip 30 which is formed by the concavity or recess defined by the opposite side of the outwardly projecting portion of the edge shoulder, as clearly seen in Figure 2. Although the specific form and size of the edge shoulder will vary among various makes and models of automobiles, all passenger vehicles are provided with some form of an enlarged edge shoulder terminating in an end edge such as that indicated at 32 in Figure 2.

It will be understood that the mounting of the signal device within the trunk interior of an automobile is merely representative of a typical automotive installation, and that the present invention contemplates detachable mounting upon any suitable edge shoulder or ledge within the body of any mobile vehicle, including such related mobile vehicles having electrical power and visual signal systems such as trailers and the like.

An audible electrical signal unit is indicated generally at 40, and includes a metallic casing or housing 42 capable of being electrically grounded by a conductive connection to the metal automobile body. A pair of electrical coils 43 each having a magnetizable core 44 are mounted within the casing 42. A metal striker 46 is carried by the casing 42 in electrical conducting relation so as to be grounded thereby, and is adapted for bending movement toward the cores 44 of the coils 43. A flexible contact blade 47 providing a contact 48 is secured to the striker 46 in conducting relation therewith. The striker 46 is mounted so as to be normally biased in a position of spaced separation from the cores 44 with the contact 48 of blade 47 in engagement with a cooperating contact 49, as shown in Figure 2. The contact 49 is insulatingly carried by the casing 42, and is electrically connected to the coils 43. Circuit energization of the coils 43 serves to magnetize the cores 44 and attract the striker 46, thereby opening the contacts 47—48, and providing a cyclical oscillation of the striker 46 to produce an audible signal, in conventional manner.

A universal spring bracket formed of metal and particularly shaped 50 is provided for mounting the audible signal unit 40 within the trunk or other interior rear body portion of substantially all automotive vehicles by a simple "snap on" attachment to an edge shoulder or molding of the body of the vehicle. In order to permit such universal adaptability for easy mounting, it is an essential and highly important feature of this invention that the bracket 50 is particularly formed and contoured. A connector flange 52 cooperates with an attaching screw 54 extending through an aperture 55 thereof for fixedly securing the bracket 50 to the casing 42 of the audible electrical signal unit 40.

A spring flange portion 56 extends from the connector flange 54, substantially at right angles thereto. The flange 56 is substantially flat adjacent the flange 54, and is formed with an angular portion 58 directed inwardly toward the casing 42. A sinuous receptor bend 60 of substantial spring resilience extends from the angular bend 58. The receptor bend 60 is formed by a double reverse turning of the bracket 50, which provides a circular curl portion 62, an inwardly offset return flange 64 of generally flat form, a forwardly directed terminal flange 66 of generally flat form spaced from and closely adjacent to flange 64, and an end edge flange 69 directed transversely within the curl 50.

The portions of the bracket 50 which extend outwardly from the connector flange 52 are capable of unitary bending movement relative to the connector flange at the area of the right angle bend from which the spring flange 56 extends. Further, the sinuous receptor bend 60 is capable of additional bending separation for entry thereinto, between the portion 58 and 68 of an edge shoulder of the vehicle body. In this way, the bracket 50 is capable of resilient "snap on" attachment to a trunk edge or similar body portion for substantially rigid retention thereon, as illustrated in Figure 2. The bracket 50 is also provided with an aperture 55a through the spring flange 56 to permit attachment of the unit 40 by means of a screw or bolt in the event that the receptor bend 60 is not utilized.

Variations in the width and thickness of the trunk edge or similar shoulder 28, and the relative body metal thicknesses and forms of flange terminal edge among various makes and models of mobile vehicles, are readily compensated for by the various resilient flanges and forms of the bracket 50. In particular, the spaced portions 58, 64, 66 of the receptor bend 60 are particularly related to each other and to the curl 62 so as to provide a length of spring contact surface of substantial extent. In addition, the arc of the curl 62 is relatively gradual and substantially circular, so that the portions 58, 64, 66 converge slightly toward each other in a rearward direction.

Referring now more particularly to Figure 4 of the drawing, a portion of the main electrical power system of the automobile is diagrammatically illustrated, wherein a battery 70 of either six or twelve volt capacity is provided. A switch 72, conventionally actuated by reverse gearing of the vehicle, or in some cases intended directional change of movement, regulates a supply of current from the battery 70 through the main lead line 20 and branch leads 22, 24 to the back-up lights 16, 18. Grounding of the lights and the battery completes the circuit. An insulated circuit connector lead 74 serves to connect the audible signal device in parallel with the main circuit. For this purpose, a coupling clip 76 of particular form is provided. The clip 76 includes a first metal loop 77 electrically contacting the wire within the insulated lead 74 by means of a piercing pin, and a second loop 78 extending from the first loop 77, also having a piercing pin 79. When the loop 78 is clamped about the insulating main lead 20, the piercing pin 79 serves to complete an electrical coupling through the insulation, without the necessity for soldering, splicing, or interruption of the main circuit. A split sleeve of tubular insulating material 80 is adapted for being slidably moved or wrapped to surround the clip 76 when coupling with the line 20 is completed, thereby insuring full insulation at the point of electrical connection.

An important feature is the provision of a pair of sharp prongs 80 extending inwardly from the bracket portion 58 toward the portion 66. The prongs 80 may be formed by a stamping or piercing of the bracket metal to project sharp points inwardly from the metal surface. The prongs 80 serve to scrapingly contact the metal body portion 28 when the bracket 50 is mounted thereon, whereby the paint or other surface coating of the vehicle body metal will be pierced to provide direct metal-to-metal contact for electrically grounding the bracket 50.

Current from the main lead line 20 is conducted through the connector lead 74 and coils 43 to the insulated contact 49. The grounded contact 48 when engaged by the contact 49 completes the circuit through the unit. In this way, when the vehicle is placed in reverse gear, or when the turn indicators are in operation, the device will be energized to provide an audible alarm signal.

Changes may be made in the construction and arrangement of the parts of the mobile electrical alarm without departing from the real spirit and purpose of our invention, and it is our intention to cover by the claims any modified form of structure or use of mechanical improvements which may be reasonably included within their scope.

What we claim as new and desire to obtain by Letters Patent of the United States of America is the following:

1. An automatic alarm device adapted to be detachably secured to a metal body edge portion of a mobile vehicle of the type having an electrical power system, comprising a self-contained electrical signal unit operative when energized to emit an audible alarm, said signal unit having an electrical circuit providing a lead adapted to be connected in parallel with the vehicle electrical power system, and bracket means rigidly secured to said signal unit and providing an outwardly extending mechanical support therefor, said bracket being formed of spring metal and having a double reverse bend at its outer end to define a resiliently deformable gripping recess of tapered form for spring tension attachment to the vehicle body, said bracket serving to electrically ground said signal unit circuit.

2. An automatic alarm device adapted to be detachably secured to a metal body edge portion of a mobile vehicle of the type having an electrical power system, comprising a self-contained electrical signal unit operative when energized to emit an audible alarm, said signal unit having an electrical circuit providing a lead adapted to be connected in parallel with the vehicle electrical power system, and bracket means rigidly secured to said signal unit and providing an outwardly extending mechanical support therefor, said bracket being formed of spring metal and having a double reverse bend at its outer end to define a resiliently deformable gripping recess of tapered form for spring tension attachment to the vehicle body, said gripping recess providing a metal contact prong for electrical grounding of said signal unit circuit to the vehicle body.

References Cited in the file of this patent

UNITED STATES PATENTS

| | | |
|---|---|---|
| 2,309,805 | Tiffany | Feb. 2, 1943 |
| 2,632,134 | Powell | Mar. 17, 1953 |